Nov. 16, 1971     W. R. EDWARDS     3,620,075

FORCE GAGE (PILOT'S)

Filed Oct. 22, 1969     3 Sheets-Sheet 1

INVENTOR
WILLIAM R. EDWARDS

BY *Thomas O. Watson Jr.*

ATTORNEY

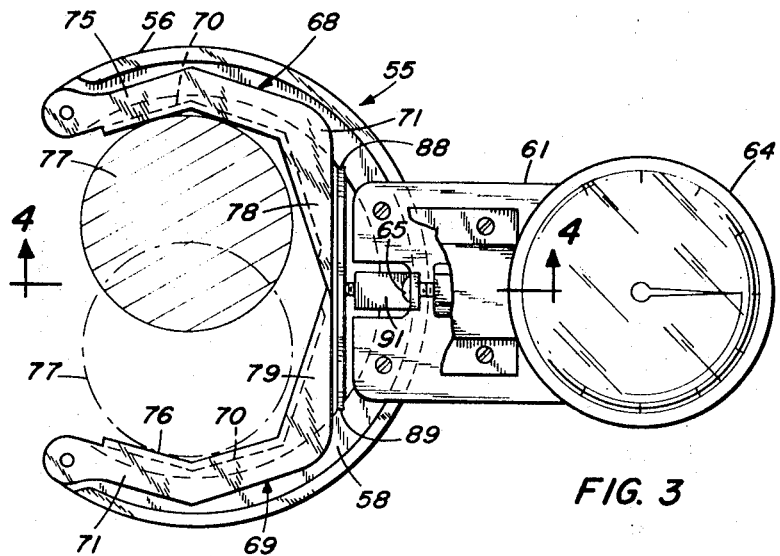
FIG. 3
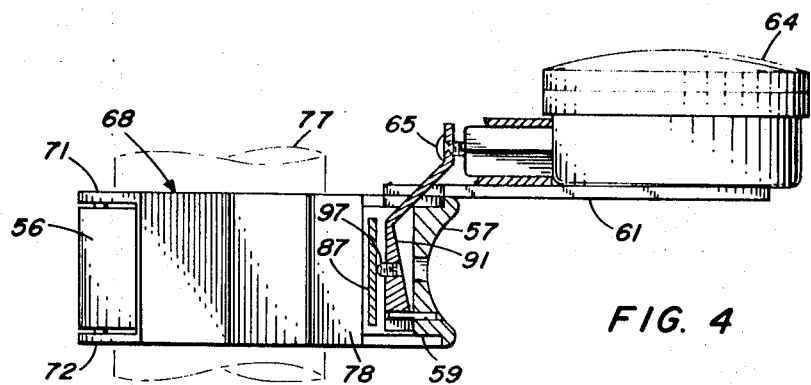
FIG. 4
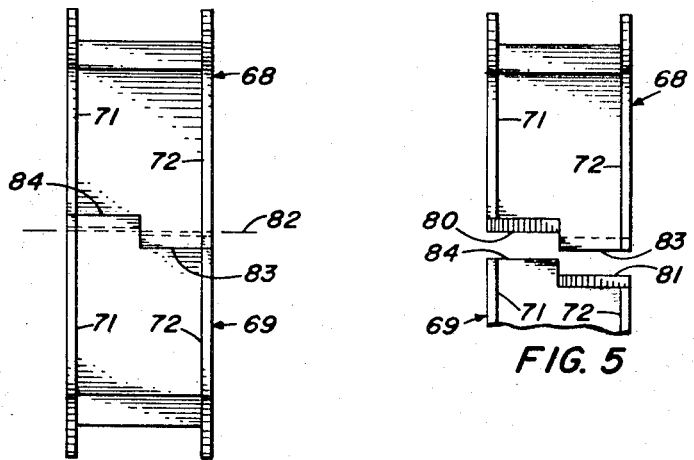
FIG. 6
FIG. 5

Nov. 16, 1971   W. R. EDWARDS   3,620,075
FORCE GAGE (PILOT'S)
Filed Oct. 22, 1969   3 Sheets-Sheet 3

United States Patent Office 3,620,075
Patented Nov. 16, 1971

3,620,075
FORCE GAGE (PILOT'S)
William R. Edwards, California, Md., assignor to the United States of America as represented by the Secretary of the Navy
Filed Oct. 22, 1969, Ser. No. 868,540
Int. Cl. G01l 5/12
U.S. Cl. 73—141 R         3 Claims

ABSTRACT OF THE DISCLOSURE

A pilot's force indicating device for positioning on the control stick of an aircraft having resiliently biased portions extending at two opposite sides of the stick and engageable therewith when the device is on the stick and force indicating structure so operatively connected to said portions that upon the pilot applying force on the device, while grasping the same, so that one of said portions pushes against one side of the control stick in connection with controlling the aircraft in flight the indicating structure operates to show the pilot the amount of force that he is then applying to the stick and upon the pilot applying force on the device, while still grasping the same, in the opposite direction so that the other of said portions pushes against the opposite side of the control stick the indicating structure operates to show the pilot the amount of force that he is then applying to the stick.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention pertains to force indicating devices and, more particularly, is directed to such a device which is held by a pilot and positioned on the control stick of an aircraft and through which the pilot can apply force to opposite sides of the stick in opposite directions, respectively, in quick and repeated sequence without turning the device with the device indicating the amount of force which is being so applied to a side of the stick during each application of force.

Force gages and force gage combinations of both the unidirectional and bidirectional types for general and various specific uses are known. However, no prior art gage or device is known which will do what the instant device can as above indicated. Moreover, nothing suitable is known which is small enough for a pilot to safely apply to the control stick of an aircraft and use during maneuvering in flight and when not so using he can easily put in his pocket while flying even aside from the other significant differences in structure and in operation. In this connection, it has been recognized for some time by experts in the aircraft control field that there has been an urgent need for a device of the instant type which can help pilots learn or acquire the feel of applying a proper amount of force on the control stick at different angles, and yet not too much force, rapidly back and forth in opposite directions to keep a helicopter in the hovering condition.

SUMMARY OF THE INVENTION

The invention represents a significant contribution. It provides what has heretofore been unknown, a small and simple force indicating device, in different embodiments, specially conceived for positioning on the control stick of a helicopter by the pilot at any angle and movement thereagainst by him back and forth in quick succession for back and forth movement of the stick with the proper pressure thereagainst for getting into and keeping the craft in the hovering condition without any hazard to flight because of a large size device and without the pilot having to turn the device around 180° for the reversal of force which not only would be unsafe but also virtually impossible to do because of it taking far too long, said device indicating the magnitude of the force during each back and forth movement of the control stick.

OBJECTS OF THE INVENTION

It is an object of the invention to provide a device which will indicate the amount of force being applied to the control stick of an aircraft when the device is positioned on the stick and the pilot applies force on the stick through the device first in one direction and then in the reverse direction without turning the device.

Another object is to provide such a device which is small enough for the pilot to conveniently use on the control stick without interfering with his control of the aircraft in flight and presenting a hazard to his safety.

A further object is to provide such a device which is small and light enough to easily fit into and be carried in the pilot's pocket.

A still further object is to provide such a device which can be quickly rotated on the control stick 90° or any number of degrees for operating the stick back and forth at this angle after using the device before such rotation.

Yet another object is to provide such a device which is of simple construction with few parts and easy to maintain and which is inexpensive to make.

Other objects, advantages and novel features of the invention will become apparent from the following detailed description of the invention when considered in conjunction with the accompanying drawings.

BRIEF DESCRIPTION OF THE DRAWINGS

FIG. 3 is a top plan view of another embodiment of the invention with the control stick of an aircraft being shown in cross section and another position of the control stick relative to the embodiment being shown in phantom;

FIG. 4 is a sectional view taken on line 4—4 of FIG. 3 and with the control stick being shown in phantom;

FIG. 5 is an end elevational view of the primary levers taken separately and as seen from the right in FIG. 4 and shown separated to facilitate an understanding thereof;

FIG. 6 is a view like FIG. 5 but with the levers shown together in assembled relation;

DESCRIPTION OF THE FIGS. 1 AND 2 EMBODIMENT

Figure 1:
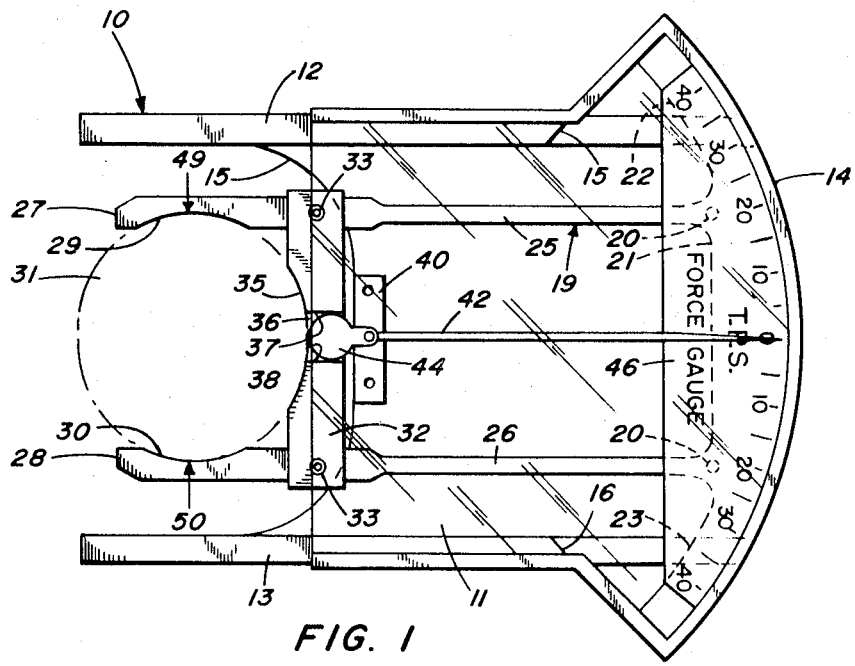
FIG. 1 is a top plan view of one embodiment of the invention with the control stick of an aircraft being shown in phantom.
Figure 2:
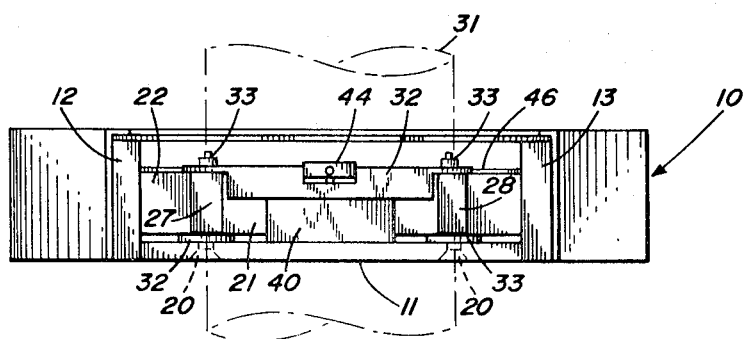
FIG. 2 is an end elevational view of the same as seen from the left in FIG. 1.

The pilot's force indicating device illustrated in FIGS. 1 and 2 comprises a support member generally designated 10 having a flat base portion 11 and a pair of flanges 12 and 13. One end of the base portions is arcuate at 14 while the opposite end is cut out at 15 between the flanges 12 and 13. These flanges are reduced in height at 15 and 16 to about 1/16" from these points to the end 14 of the support member.

A one piece or unitary member generally designated 19 constructed of resilient material such as aluminum is secured to the support member 10 by a pair of screws 20 passing through the base portion 11 and into an arculate head portion 21 of the member 19. The arculate ends 22 and 23 of the portion 21 rest on the reduced portions of the flanges 12 and 13. The member 19 includes a pair of spaced, parallel, resilient portions 25 and 26 which extend from the head portion 21. A pair of arms 27 and 28 extend in turn from the portions 25 and 26. These arms are arcuately cut out at 29 and 30 for engagement with opposite sides of the control stick 31 of the aircraft.

The relatively thin and long form of each of the portions 25 and 26 allow the same to resiliently flex in unison to provide a more sensitixe flex than would be possible with a single flexing member upon force being applied to the arms 27 and 28 at the cutouts 29 and 30. The portions 25 and 26 resiliently bias the arms 27 and 28 to the normal position of each shown in FIG. 1.

A member 32 extends across between the arms 27 and 28 being pivotably connected thereto by pins 33. The cross member 32 is arcuately cut out at 35 for contact therealong by one side of the control stick 31. The member 31 is also provided with a slot 36 extending transversely across its middle and having flat sidewalls 37 and 38.

An elongated block 40 is secured to the base portion 11 of the support member 10. A needle 42 is pivotably supported on the block 40. This member includes a disc like element at one end, which is within the slot 36 of the cross member 32 being in contact with the opposite flat walls 37 and 38 thereof.

A dial member 41 is secured to and rests upon the upper surface of the head portion 21 of the member 19. A dial member is provided with a zero mark at the center of its forward edge where the needle 42 normally rests. Additional marks are provided to each side of the zero mark with adequate numbers to indicate a double scale of one scale on each side of the zero mark.

OPERATION OF THE FIGS. 1 AND 2 EMBODIMENT

After the aircraft is in flight normally, the device is placed over the upper end of the control stick 31 of the aircraft with the cutout surfaces 29 and 30 of the arms 27 and 28 being on opposite sides of the stick. The device is then pushed down along the stick to the center of the part thereof which would normally be grasped by the pilot's hands with the device extending to the side as shown in FIG. 1.

The pilot grasped the device in his right hand, normally, with his thumb along the flange 13 and his first three fingers along the flange 12 and the rest of his hand passing underneath the base portion 11. Especially in causing a helicopter to hover, the pilot applies force to the control stick 31 back and forth in the directions of arrows 49 and 50 in more or less rapid sequence. When force is applied in the direction of arrow 49 by the pilot pulling his hand which grasps the device towards himself, resistance to movement by the control stick causes a certain slight bending or flexure of the extending portion 25 of the device. The movement of the arm 27 relative to the support member 10 of the device is transmitted to the opposite arm 28 and through the cross member 32. Movement of the arm 28 causes a certain bending or flexure of the extending portion 26 of the device. When the movement of the control stick 31 in this direction is finished, the resiliency of the portions 25 and 26 causes these portions and also the arms 27 and 28 to return to the unstressed, normal positions shown in FIG. 1. During the flexure of the portions 25 and 26 the disc-like portion 44 of the needle is moved to one side by movement of the surface 38 of the slot 36, thus to swing the needle 42 to one side to indicate the amount of force that is being applied to the control stick in this direction.

When the pilot pushes the device away from himself to apply force to the stick 31 in the direction of arrow 50, the portions 25 and 26 will flex in the opposite direction to swing the needle 42 in the opposite direction by movement of the surface 37 of the cross member 32 against the disc-like portion 44 of the needle to indicate the amount of force being exerted on the opposite side of the control stick 31 on the other side of the zero mark of the dial 33. When the movement of the control stick in this opposite direction has ceased, the resilient portions 25 and 26 return the arms 27 and 28 to their normal positions shown in FIG. 1.

This device is particularly useful in helping pilots to learn the feel of applying the proper amount of pressure on the control stick back and forth to keep a helicopter in a hovering condition. Only a certain amount of force must be applied back and forth in opposite directions in quick succession and repeatedly so to keep the craft in this hovering condition.

After applying the prescribed amount of force on the control stick 31 alternately in the direction of arrows 49 and 50 and getting the feel in these directions, the pilot then rotates the device on the control stick to a position perpendicular to the position shown in FIG. 1. The pilot then grips the device somewhat differently and again moves the control stick back and forth by applying pressure on the device in opposite directions sidewise again applying just the right amount of force to the control stick in the opposite sidewise directions to keep the aircraft in the hovering condition. Again the pilot will in time get the feel for applying the proper amount of force in these opposite directions. The device may be turned on the control stick 45° or through any angle or as many angles as desired to allow the pilot to get a better feel for moving the stick in any or all of the back and forth directions which is involved in keeping a helicopter in the hovering condition.

After using the device for a while and getting the feel of applying the correct amount of force as specified in instructions and not too much force so that the craft ceases to hover, the pilot can slip the device off the control stick and grip the latter for controlling the craft in the normal way.

DESCRIPTION OF THE FIGS. 3 THROUGH 6 EMBODIMENT

The device shown in FIGS. 3 through 6 comprises support means generally designated 55 which includes a C-shaped member 56. This member is provided with an arcuate groove 57 extending along the outer periphery thereof and the upper and bottom surfaces of the member are relieved at 58 and 59. The support means further includes a plate 61 which rests on top of the C-shaped member 56 and also a spacer positioned in the relief being secured to the member by screws.

A force indicator 64 is mounted on the plate 61 so that the center line thereof is along the longitudinal center line of the entire device. The indicator is a conventional unidirectional indicator provided with a screw 65 which extends to the exterior of the indicator. When this screw is pushed inwardly the needle swings on the dial to indicate the amount of force which is being applied. Resilient biasing means within the indicator returns the screw 65 to its original extended or normal position shown in FIG. 2 when the inward force stops.

A pair of primary levers generally designated 68 and 69 are mounted on the C-shaped member 56. These levers are of identical construction but lever 69, for instance, is turned over and mounted on the other side of the C-shaped member. Each of these levers have a web 70 and upper and lower flanges 71 and 72. These levers are pivotably mounted at their outer ends to the C-shaped member 56 by pins extending through the flanges of the levers and the outer ends of the C-shaped member. The levers are so positioned on the latter member that the upper and lower flanges 71 and 72 of each lever are received within the reliefs 58 and 59 of the member. The levers 68 and 69 can only pivot limited distances before the flanges thereof engage the arcuate vertical surfaces of the reliefs 58 and 59 which act as stops.

The levers 68 and 69 have arms 75 and 76 which are of V-shape for engagement with opposite sides of the control stick 77 of the aircraft. These levers are also provided with inner portions 78 and 79 which come together at the longitudinal center plane of the device. The inner ends of these levers are relieved or notched at 80 and 81 (see FIG. 5) to permit these ends to mate or both extend along the center plane 82 of the device (see FIG. 6). As can be seen in the latter figure, the extending end portion 83 of lever 68 extends along said center plane 82 and a little therebeyond while the extending portion 84 of the other lever likewise extends along said center plane and a little therebeyond but above the portion 83 of the first lever.

A flat, generally rectangular metal spring member 87 extends between the two sides of the C-shaped member 55 near the back thereof being received in notches 88 and 89 in the member 55 for positioning of the spring. A movement amplifying secondary lever 91 is positioned within the space between the spring 87 and the back of the C-shaped member 55 which lever extends up at an angle through a notch in the spacer and also a notch in the plate 61 terminating in a vertical portion having an aperture with a V-shaped inner periphery for threaded engagement with the threads of the screw 65 of the indicator 64. The lower part of the lever 91 is of wedge shape with the larger lower end thereof engaging the inner surface of the back of the C-shaped member 55 for rocking motion thereagainst during operation of the device. A headless screw 97 extends from the wedge shaped portion of the lever 91 along both the horizontal and vertical center planes of the device which screw engages the backside of the spring 87.

OPERATION OF THE FIGS. 3 THROUGH 6 EMBODIMENT

In using the instant device, the pilot grasped the same with the thumb and forefinger of his right hand, normally, being positioned within the arcuate groove 57 around the outside of the C-shaped member 55 and with the plate 61 extending over the rest of his hand. He then moves the device so as to in effect pass the control stick 77 through the space between the ends of the C-shaped member 55 and into the open interior thereof.

In the course of causing a heliocopter to hover, the pilot applies force on the control stick back and forth in opposite directions. FIG. 3 shows the device positioned so that the stick 77 is received within the V-shape arm 75 of primary lever 68. With the device in this position on the stick, the pilot pulls the stick towards him by applying force on the device. The resistance of the control stick to this movement causes the lever 68 to pivot so that the end portion 83 thereof pushes against the center of the spring 87 flexing the same. The spring in turn pushes against the head of the screw 97 of the secondary lever 91, thus to cause rocking of this lever for depression of the screw 65 and operation of the indicator 64. With the aid of this device, the pilot applies the proper amount of pressure on the stick.

The pilot then quickly moves the device so that the opposite side of the control stick 77 is received within the V-shape arm 76 of primary lever 69, as shown in phantom in FIG. 3, and applies pressure to the device so as to push the control stick in the opposite direction. This time lever 69 pivots to cause the end portion 84 thereof to press against the center of the spring 87 which again in turn pushes against the head of the screw 97 of the secondary lever 91 for again pivoting this lever and causing depression of the screw 65 and resultant operation of the indicator 64. The pilot again applies the proper amount of force on the stick which he can determine by watching the indicator. When the force against the control stick in each of these opposite directions is stopped the spring 87 biases or returns the pivoted lever back to its normal position shown in FIG. 3. The biasing means within the indicator 64 simultaneously returns the secondary lever 91 to its normal position shown in FIG. 4.

It is therefore seen that the device of FIGS. 3-6 may be used to apply force to the control stick back and forth in opposite directions in quick succession as many times as necessary to get the feel of applying the proper amount of force to keep the heliocopter in the hovering condition. He may also get the feel of applying the proper amount of force on the stick back and forth at right angles to the application of force just described by merely turning his hand 90° and applying side to side force against the stick. He can also turn the device on the stick to any desired angle or angles followed by the back and forth movement of the stick through such movement of the device. When the feel has been gotten in at least directions perpendicular to each other, the device can be taken off the stick and put in the pilot's pocket.

DESCRIPTION OF THE FIGS. 7 AND 8 EMBODIMENT

Figure 8:
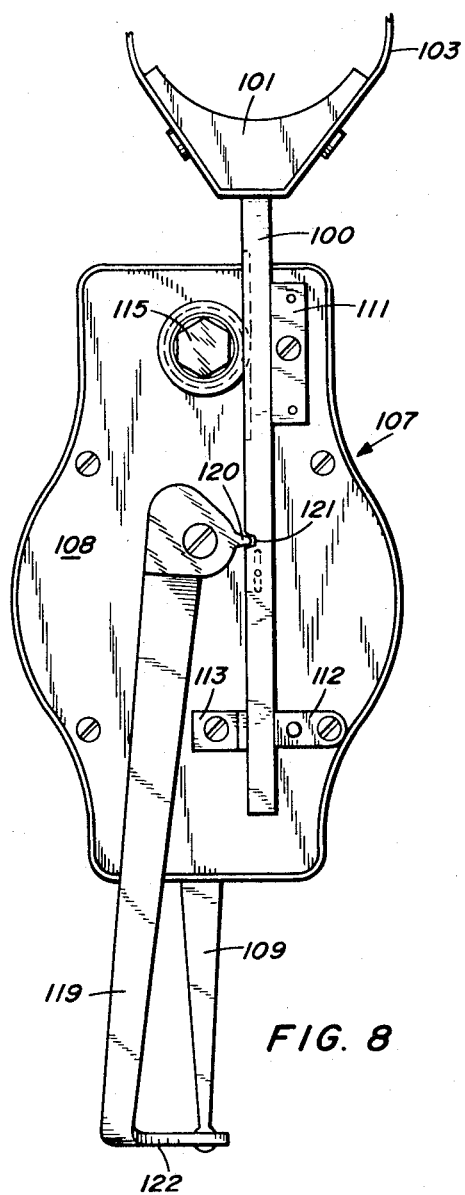
FIG. 8 is a bottom plan view of the same with the housing removed.
Figure 7:
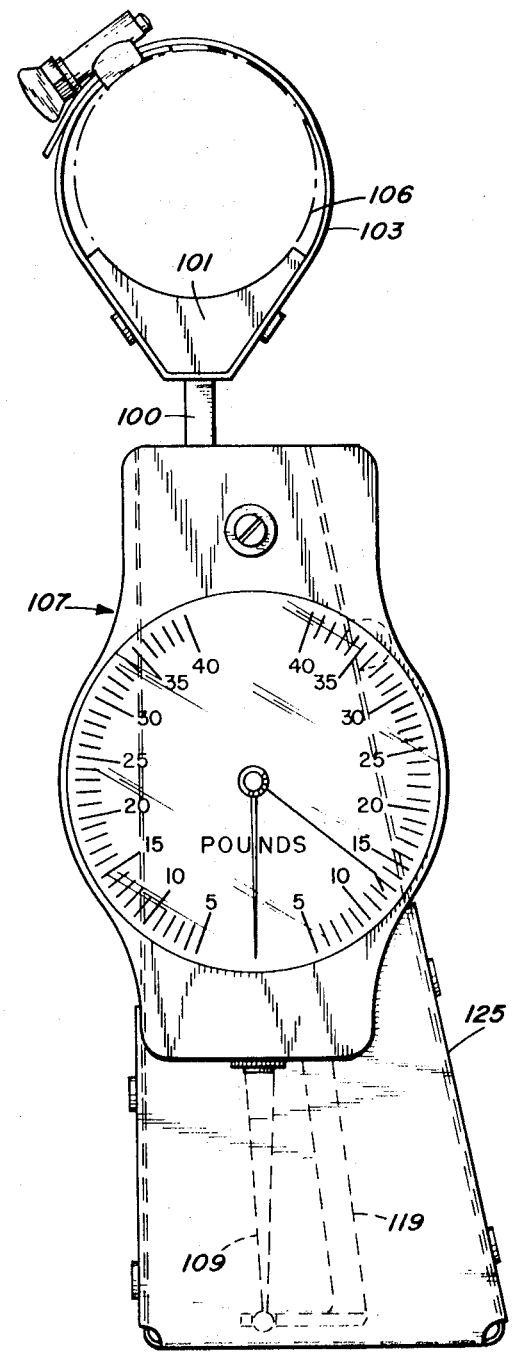
FIG. 7 is a top plan view of yet another embodiment of the invention shown on the control stick of an aircraft.
Figure 9:
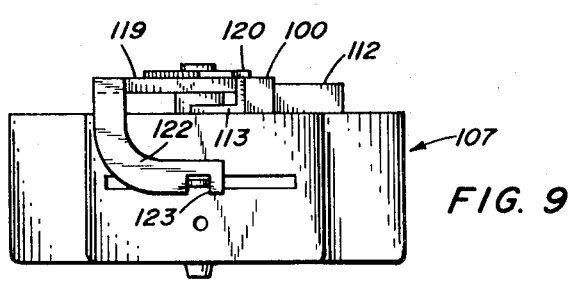
FIG. 9 is an end elevational view of the device as shown in FIG. 8.

The device shown in FIGS. 7 and 8 comprises a reciprocally movable member 100 having a head portion 101 with an arcuate surface to which head portion a conventional hose clamp 103 is attached. The member 100 moves along and is mounted on the back plate 108 of a conventional bidirectional force indicator generally designated 107 having a swingably mounted member 109 extending out therefrom for operation of the indicator in its two directions upon movement of the member in its two opposite directions from the resiliently maintained normal position shown in full lines in FIGS. 7 and 8. The back plate 108 of the indicator serves as a support member for the other parts of the device. Supports and guide members 111, 112 and 113 which are secured to the back plate help position and guide the member 100. A flanged roller 115 mounted on the plate 108 also helps to guide and position the member 100, the flange at the upper end of the roller extending within a slot in the member 100.

A lever 119 which is pivotably mounted to the plate 108 is provided with an outwardly projecting tooth 120 which engages the member 100 within a slot 121 thereof. The lever 119 has an outer end portion 122 with a slot 123 therein which receives the end of the member 109 of the indicator 107. A two-piece housing 125 is secured to the indicator 107 to cover the parts outside of the indicator. The housing is so formed as to constitute a handle or portion to be grasped by the pilot during use of the device.

OPERATION OF THE FIGS. 7 THROUGH 9 EMBODIMENT

The pilot loosens the hose clamp 103 and slips the same over the top of the control stick 106 and down therealong to the center of the place where the pilot normally grasps the stick. The hose clamp is then tightened on the control stick with the device extending along the longitudinal axis of the aircraft. The tightening should be such as to permit the device to be rotated or turned on the stick later to any desired angle.

The pilot then grasps the handle portion 125 of the device and in the course of seeking to keep a helicopter in the hovering condition, especially, he pushes and pulls the device and consequently the stick back and forth as necessary applying no more than the prescribed amount of force in the opposite directions. When he has gotten the feel of applying the proper amount of force in the longitudinal or forward and back directions, he turns the device on the control stick 90° and again pushes and pulls the device and consequently the stick in the two opposite cross or transverse directions to again learn the feel of keeping the aircraft in the hovering condition. By watching the needle of the indicator 107 and not letting it exceed the proper amount of force on each side of the zero. The pilot may also turn the device at any in between angle for similar operation.

Again getting the feel in at least the longitudinal and cross directions, the pilot loosens the hose clamp 103 and removes the device from the control stick 107 and puts the device into his pocket.

Although the three embodiments or devices described are especially usable for learning or acquiring the feel of getting a helicopter into and keeping it in the hovering condition where the control stick is moved or played rather lightly and rapidly back and forth in different directions as necessary of the 360°, the devices may also be used in other maneuvers. Also, the devices may be used on airplanes.

Obviously many modifications and variations of the present invention are possible in the light of the above teachings.

What is claimed is:

1. A device to indicate the amount of force being applied to an object, comprising:
   support means for holding the device so that a force may be applied to said object;
   biased means including a pair of arms movably mounted on said support means for engagement with said object;
   resilient means including a pair of extending members coupling said biased means to the device;
   indicating means including a marked reference surface and needle means pivotably mounted on the support means and biased to a normal position;
   a connecting member pivotally attached across said arms;
   means coupling said connecting member to said needle means;
   said indicating means being responsive to indicate the intensity of forces applied to the object through said device.

2. The device as recited in claim 1 wherein said extending members are straight in an unstressed condition.

3. The device as recited in claim 2 wherein said extending members are parallel.

References Cited

UNITED STATES PATENTS

| 1,388,866 | 8/1921 | Lambert | 269—254 X |
|---|---|---|---|
| 1,519,210 | 12/1924 | McGuckin | 269—254 X |
| 1,587,181 | 6/1926 | Pomeroy et al. | 269—254 X |
| 2,466,909 | 4/1949 | Periman | 24—263 |
| 1,614,354 | 1/1927 | Faber | 73—141 |
| 2,112,252 | 3/1938 | Sang | 73—141 |
| 2,974,527 | 3/1961 | Linthout | 73—381 |

RICHARD C. QUEISSER, Primary Examiner

J. WHALEN, Assistant Examiner

U.S. Cl. X.R.

73—379